United States Patent
Takita

(10) Patent No.: US 10,382,648 B2
(45) Date of Patent: Aug. 13, 2019

(54) SCANNER, AND SCANNED IMAGE GENERATING METHOD

(71) Applicant: SEIKO EPSON CORPORATION, Tokyo (JP)

(72) Inventor: Kazuya Takita, Shimonoseki (JP)

(73) Assignee: Seiko Epson Corporation, Tokyo (JP)

( * ) Notice: Subject to any disclaimer, the term of this patent is extended or adjusted under 35 U.S.C. 154(b) by 40 days.

(21) Appl. No.: 15/617,644

(22) Filed: Jun. 8, 2017

(65) Prior Publication Data

US 2017/0366706 A1 Dec. 21, 2017

(30) Foreign Application Priority Data

Jun. 16, 2016 (JP) ................. 2016-119630

(51) Int. Cl.
*H04N 1/401* (2006.01)
*H04N 1/191* (2006.01)
*H04N 1/10* (2006.01)
*H04N 1/40* (2006.01)

(52) U.S. Cl.
CPC ........... *H04N 1/401* (2013.01); *H04N 1/1017* (2013.01); *H04N 1/1912* (2013.01); *H04N 1/40* (2013.01); *H04N 1/40056* (2013.01); *H04N 2201/0081* (2013.01); *H04N 2201/04748* (2013.01)

(58) Field of Classification Search
CPC .... H04N 1/401; H04N 1/1017; H04N 1/1912; H04N 1/40; H04N 1/40056; H04N 2201/0081; H04N 2201/04748; H04N 5/3692; H04N 5/378; H04N 5/3765; H04N 9/045

See application file for complete search history.

(56) References Cited

U.S. PATENT DOCUMENTS

| 2007/0285739 A1* | 12/2007 | Nakano | H04N 1/00013 358/474 |
| 2010/0118355 A1* | 5/2010 | Hanagata | H04N 1/40056 358/475 |
| 2013/0221199 A1* | 8/2013 | Kato | H04N 5/3692 250/208.1 |
| 2016/0044288 A1 | 2/2016 | Kato | |

FOREIGN PATENT DOCUMENTS

| JP | 2010-118721 | 5/2010 |
| JP | 2013-211838 | 10/2013 |
| JP | 2015-159438 | 9/2015 |

* cited by examiner

*Primary Examiner* — Iriana Cruz
(74) *Attorney, Agent, or Firm* — Workman Nydegger

(57) ABSTRACT

A scanner has a first sensor array; a second sensor array; a timing controller that individually outputs at different times a first drive signal that drives the first sensor array, and a second drive signal that the second sensor array; and a light source configured that emits and illuminates a document during periods between the first drive signal and the second drive signal output next after the first drive signal, and periods between the second drive signal and the first drive signal output next after the second drive signal.

9 Claims, 6 Drawing Sheets

SCANNER, AND SCANNED IMAGE GENERATING METHOD

CROSS-REFERENCE TO RELATED APPLICATIONS

The present application claims priority to Japanese Patent Application No. 2016-119630, filed Jun. 16, 2016, which is hereby incorporated by reference in its entirety.

BACKGROUND

1. Technical Field

The present invention relates to a scanner, and a scanned image generating method.

2. Related Art

Image scanners according to the related art typically have three sensor arrays, one each for red, green, and blue (RGB), in the sub-scanning direction, and employ a method of cancelling the difference in the scanning positions of the sensor arrays by shifting the drive timing of each sensor array. See, for example, JP-A-2015-159438.

However, in a configuration that simply shifts the drive timing, the timing when the light source turns on relative to the drive period of the sensors (charge accumulation time) may differ according to the sensor array. As a result, the quality of the scanned image of a document may drop.

SUMMARY

An objective of the present invention is to improve the quality of scanned images.

To achieve the foregoing objective, a scanner according to the invention has a first sensor array, a second sensor array, a timing controller, and a light source. The first sensor array has multiple first sensors arrayed in a main scanning direction. The second sensor array is a second sensor array of multiple second sensors arrayed in the main scanning direction, disposed offset in the sub-scanning direction from the first sensor array. The timing controller outputs a first drive signal that cyclically drives the multiple first sensors of the first sensor array, and a second drive signal that drives the multiple second sensors of the second sensor array on the same cycle (period of the same length) as the first drive signal, individually and at different times to scan the same range in the sub-scanning direction of the document moving in the sub-scanning direction relative to the first sensor array and second sensor array. The light source emits and illuminates the document in periods between the first drive signal and the second drive signal output next after the first drive signal, and periods between the second drive signal and the first drive signal output next after the second drive signal.

The configuration of the invention whereby the light source emits both in periods Ⓑ between the first drive signal and the second drive signal, and periods Ⓡ between the second drive signal and the first drive signal, can more easily reduce the difference between the emission timing of the light source in the drive periods of the first sensors and the emission timing of the light source in the drive periods of the second sensors, that can a configuration in which the light source emits only in period Ⓑ or period Ⓡ. For example, in a configuration in which the light source emits only in period Ⓑ or period Ⓡ, one of the first sensor and second sensor emits only in the first half of the drive period, and the other emits only in the second half of the drive period. The configuration of the invention in which the light source emits in both periods Ⓑ and Ⓡ, both the first sensor and second sensor have an on period in both the first half and second half of the drive period. As a result, the difference in the exposure conditions of the sensor arrays can be reduced when the sensor arrays scan the same range in the sub-scanning direction of the document. As a result, the image quality of the scanned image of the document can be improved.

Other objects and attainments together with a fuller understanding of the invention will become apparent and appreciated by referring to the following description and claims taken in conjunction with the accompanying drawings.

DESCRIPTION OF EMBODIMENTS

Figure 1:
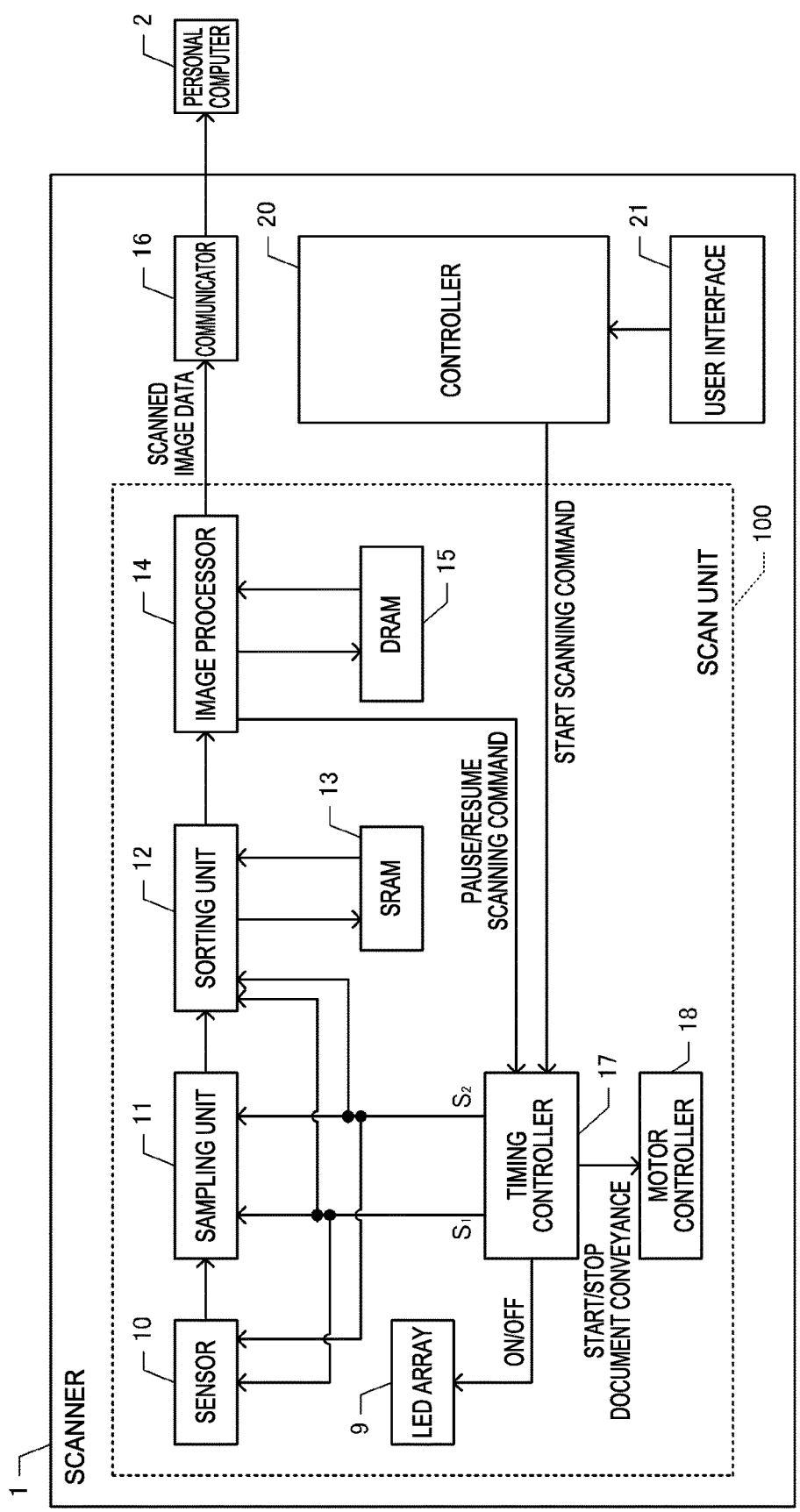
FIG. 1 is a block diagram illustrating the configuration of a scanner.

A preferred embodiment of the present invention is described below with reference to the accompanying figures. Note that like parts in the accompanying figures are referenced by like reference numerals, and redundant description thereof is omitted.

1. Embodiment 1

1-1. Scanner Configuration

FIG. 1 is a block diagram illustrating the configuration of a scanner 1 according to this embodiment of the invention.

The scanner 1 has a scan unit 100, controller 20, user interface 21, and communicator 16.

The controller 20 comprises a CPU, RAM, ROM, and other peripheral circuits not shown, and controls the scanning operation of the scanner 1 by the CPU using RAM to execute a control program stored in ROM. The scanning operation of the scanner 1 may also be controlled by using an ASIC in addition to or instead of the CPU. The user interface 21 includes a touch panel and keys, for example. The controller 20 displays information on the touch panel appropriately to the operation of the scanner 1, and receives user instructions input through the touch panel and keys.

The communicator 16 includes a communication interface circuit for wired or wireless communication with an external device such as a personal computer 2.

When a user instruction to start scanning is received through the user interface 21, the controller 20 outputs a control signal instructing starting scanning to the scan unit 100, and executes the document scanning operation.

The scan unit 100 scans the document while conveying the document. The scanned image data generated by the scan unit 100 is sequentially output through the communicator 16 to the personal computer 2.

1-2: Scan Unit Configuration

Figure 2:
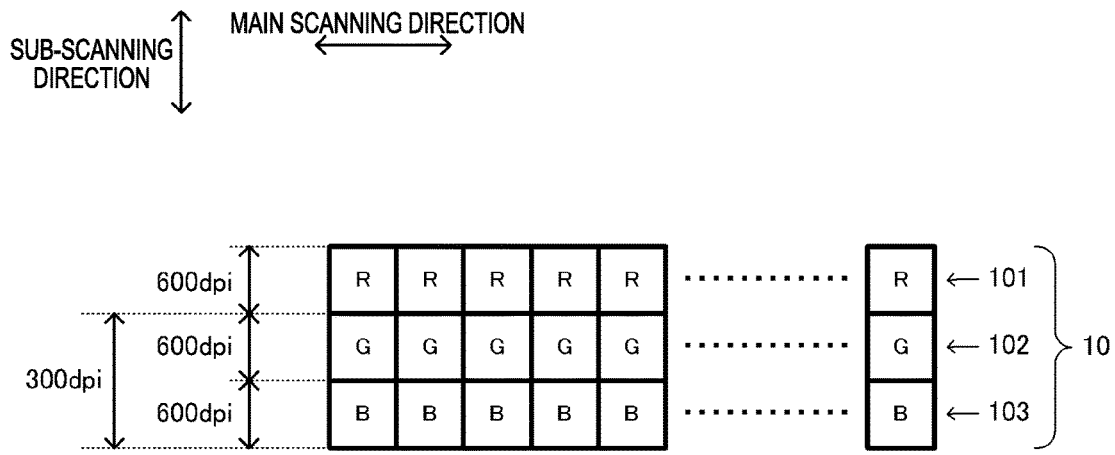
FIG. 2 illustrates the configuration of a sensor array.

The scan unit 100 includes LEDs 9 as the light source, a sensor 10, sampling unit 11, sorting unit 12, SRAM 13, image processor 14, DRAM 15, timing controller 17, and motor controller 18. FIG. 2 illustrates the configuration of the sensor 10. As shown in the figure, the sensor 10 includes a R sensor array 101, G sensor array 102, and B sensor array 103. The R sensor array 101 comprises numerous red sensors aligned in one direction for detecting red (R) light. This direction is referred to as the main scanning direction. The direction perpendicular to the main scanning direction and parallel to the direction in which the document is conveyed is referred to as the sub-scanning direction. The G sensor array 102 comprises numerous green sensors aligned in one direction for detecting green (G) light. The B sensor array 103 comprises numerous blue sensors aligned in one direction for detecting blue (B) light.

The sensor arrays are arranged in the order RGB from the downstream side of document conveyance in the sub-scanning direction. The G sensor array 102 is located at a distance equal to 600 dpi in the sub-scanning direction from the R sensor array 101. The B sensor array 103 is located at a distance equal to 600 dpi in the sub-scanning direction from the G sensor array 102. The B sensor array 103 is therefore disposed at an interval equal to 300 dpi from the R sensor array 101. The scanner 1 scans at 300 dpi by synchronizing the drive period of the R sensor array 101 and B sensor array 103 group, and the drive period of the G sensor array 102, to two different drive signals (S1, S2). The R sensor array 101 and B sensor array 103 in this example may also be referred to as a first sensor array, and the G sensor array 102 as a second sensor array.

The LEDs 9 form a linear light source disposed parallel to the main scanning direction, and emit light to the document. The RGB sensor arrays receive light reflected from the document. The amount of light is adjusted by the length of time the LEDs 9 are on in one drive period of the sensors. The timing controller 17 generates and outputs (applies) timing signals for the scanning operation.

More specifically, the timing controller 17 outputs two different drive signals (first drive signal S1, second drive signal S2) for driving the sensor 10 to the sensor 10, sampling unit 11, and sorting unit 12. The first drive signal S1 is a signal for driving the R sensor array 101 and B sensor array 103, and the second drive signal S2 is a signal for driving the G sensor array 102. In this embodiment, the output timing of the first drive signal S1 and second drive signal S2 is when the potential of the normally High signal line goes Low (that is, at the falling edge of the negative logic pulse). The timing controller 17 also outputs to the LEDs 9 a control signal controlling the on or off timing of the LEDs 9. In this example, the LEDs 9 turn on when this control signal is Low, and turn off when the control signal is High. The timing controller 17 also outputs to the motor controller 18, which controls driving a motor for conveying the document, a control signal instructing starting or stopping document conveyance.

The sampling unit 11 A/D converts the output values from the sensors in each sensor array synchronized to the first drive signal S1 and second drive signal S2, and outputs the converted pixel values for one line to the sorting unit 12.

The sorting unit 12 temporarily stores the RGB pixel values for one line output from the sampling unit 11 in SRAM 13, and then referencing the SRAM 13, rearranges the pixel values for the same range (same line) in the sub-scanning direction of the document to get the value of the pixel in that range (line), and outputs to the image processor 14. The sorting unit 12 then deletes the pixel values for the line output to the image processor 14 from SRAM 13.

The image processor 14, using DRAM 15, applies to the pixel values acquired from the sorting unit 12 image processes such as shading correction, skew correction, and γ correction, and generates the scanned image data. The image processor 14 temporarily stores data while processing and after processing in DRAM 15. The image processor 14 then reads and sends the scanned image data generated by shading correction and other image processing operations from DRAM 15 through the communicator 16 to the personal computer 2 connected to the scanner 1. The image processor 14 then deletes the scanned image data that was sent to the personal computer 2 from DRAM 15.

1-3: Scanning at 300 dpi

Figure 3:
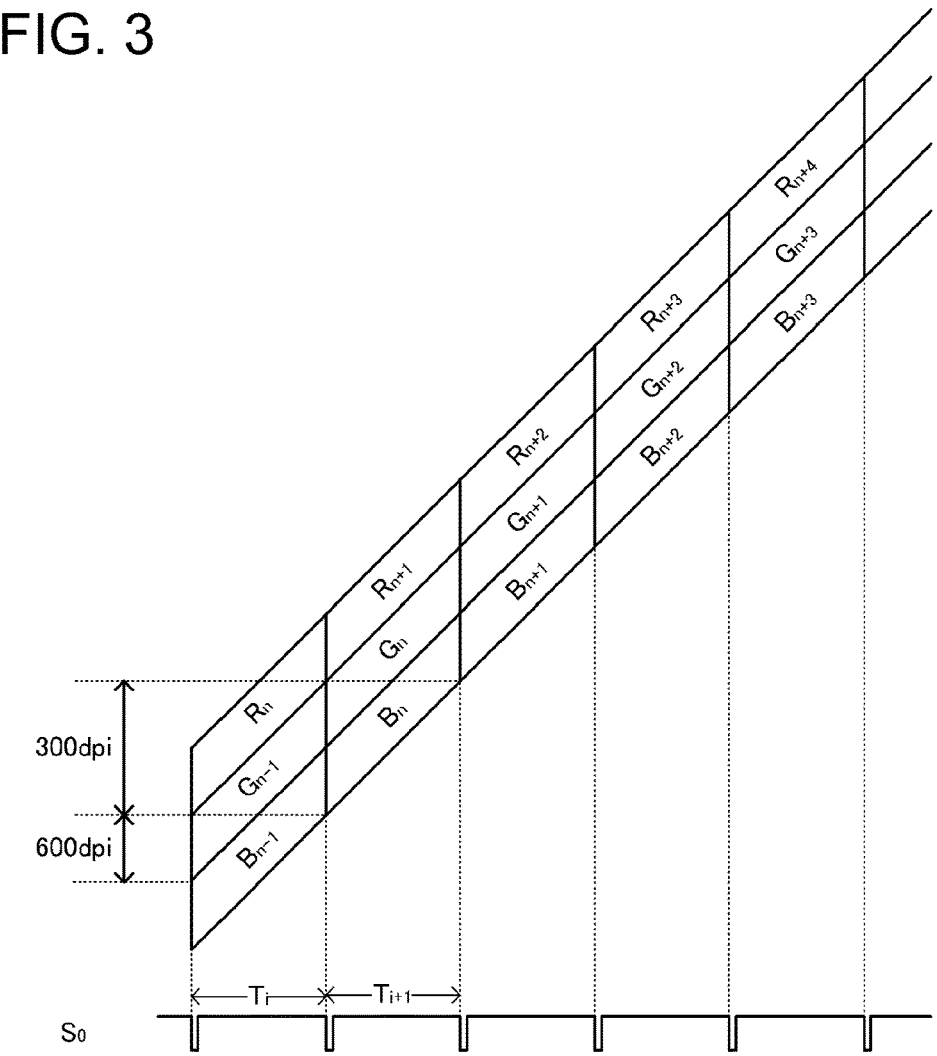
FIG. 3 is a timing chart of a comparison example.
Figure 3:
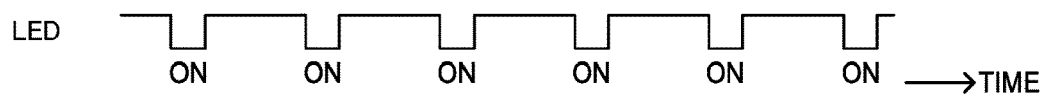

Operation of the scan unit 100 of the scanner 1 having this sensor 10 when scanning at 300 dpi is described more specifically next. The distance of 300 dpi is half the 600 dpi distance between the sensor arrays in the sub-scanning direction, and the size of one pixel in the sub-scanning direction is 1/300 inch, or twice the pixel size at 600 dpi. FIG. 3 is a timing chart for comparison with the invention. In the comparison sample shown in FIG. 3, each sensor of the three sensor arrays stores charges synchronized to a cyclically generated drive signal S0. Each LED lights once in each drive period defined by drive signal S0. The timing chart in FIG. 3 shows the scanning period of the sensors in each sensor array in the sub-scanning direction of the document over time. Rn, Gn−1, and Bn−1 indicate the scanning period of each sensor array in the sub-scanning direction of the document during drive period Ti. The document is conveyed at a constant speed synchronized to the drive signal S0. The document is conveyed the distance equal to 300 dpi in one drive period.

Pixel values for the same range (same line) in the sub-scanning direction of the document can therefore comprise the R and B values output offset one drive period. More specifically, the R pixel values on line n can use the value of Rn read in drive period Ti, and the B pixel values on line n can use the value of Bn read in drive period Ti+1. The G pixel values may be the value of Gn−1 read in drive period Ti, or the value of Gn read in drive period Ti+1. However, whether Gn−1 or Gn is used, only G will be read at 600 dpi for the corresponding R and B values read in the sub-scanning direction of the document.

Figure 4:
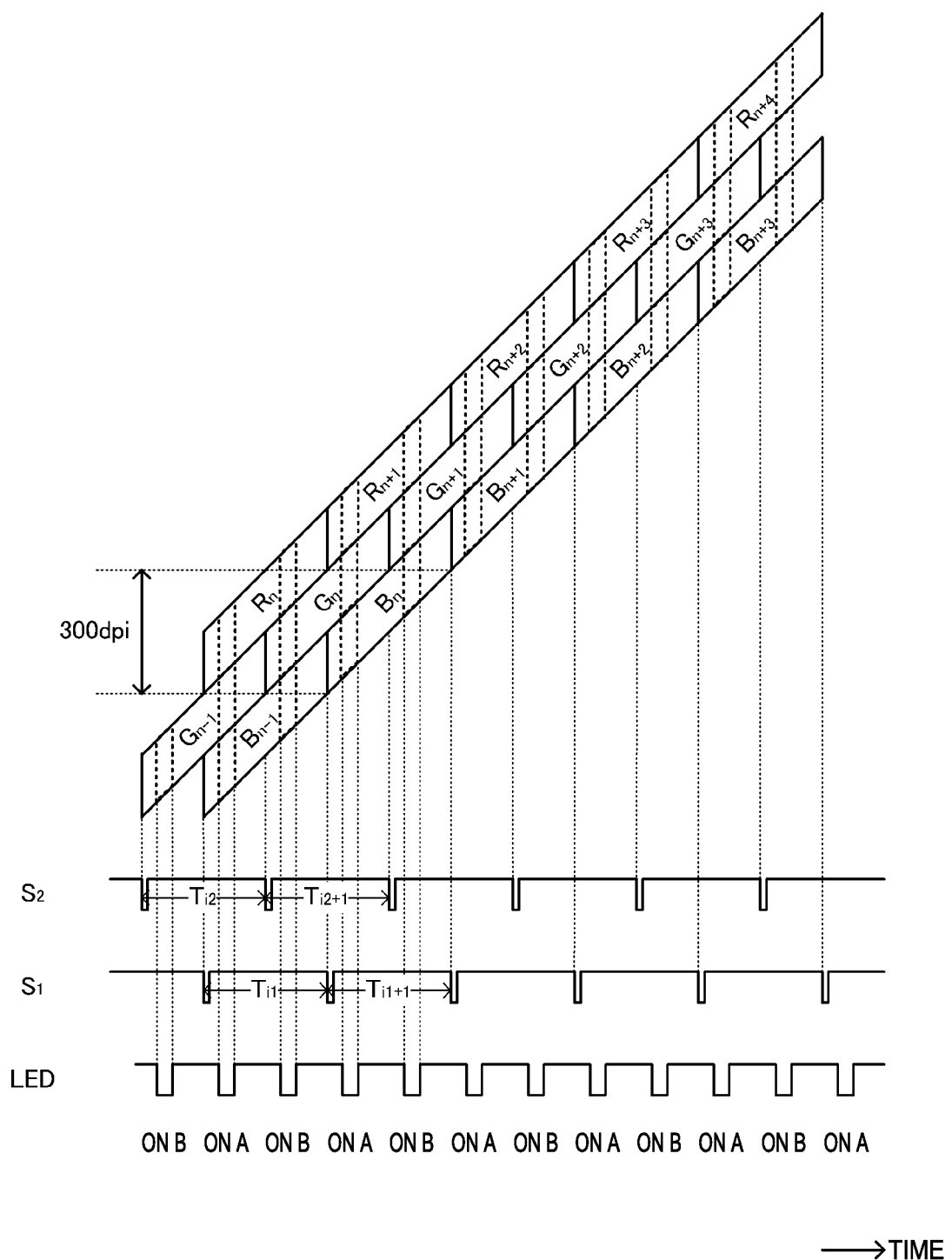
FIG. 4 is a timing chart of an embodiment of the invention.

As shown in FIG. 4, this embodiment of the invention therefore offsets the G drive cycle one-half period from the R and B drive period. The R sensor array 101 and B sensor array 103 store a charge synchronized to first drive signal S1. Rn and Bn−1 respectively indicate the scanning range of the R sensor array 101 and B sensor array 103 in the sub-scanning direction of the document during drive period Ti1. Rn+1 and Bn respectively indicate the scanning range of the R sensor array 101 and B sensor array 103 in the sub-scanning direction of the document during drive period Ti1+1. The G sensor array 102 stores a charge synchronized to the second drive signal S2. Gn indicates the scanning range of the G sensor array 102 in the sub-scanning direction of the document in drive period Ti2+1.

The pixel values for the same range (same line) in the sub-scanning direction of the document may comprise the R and B values output one drive period apart. More specifically, the Rn values read in drive period Ti1 can be used for the R pixel values on line n, and the Bn values read in drive period Ti1+1 can be used for the B pixel values on line n. The Gn values read in drive period Ti2+1 are used for the G pixel values. As a result, a sensor 10 having RGB sensor arrays disposed at a 600 dpi interval can scan at 300 dpi without producing a color shift.

In this embodiment, the LEDs 9 of the R sensor array 101 and B sensor array 103, and the G sensor array 102, emit twice in one drive period. More specifically, the LEDs 9 emit once in the interval from first drive signal S1 to second drive signal S2, and once in the interval from second drive signal S2 to first drive signal S1.

Figure 5:
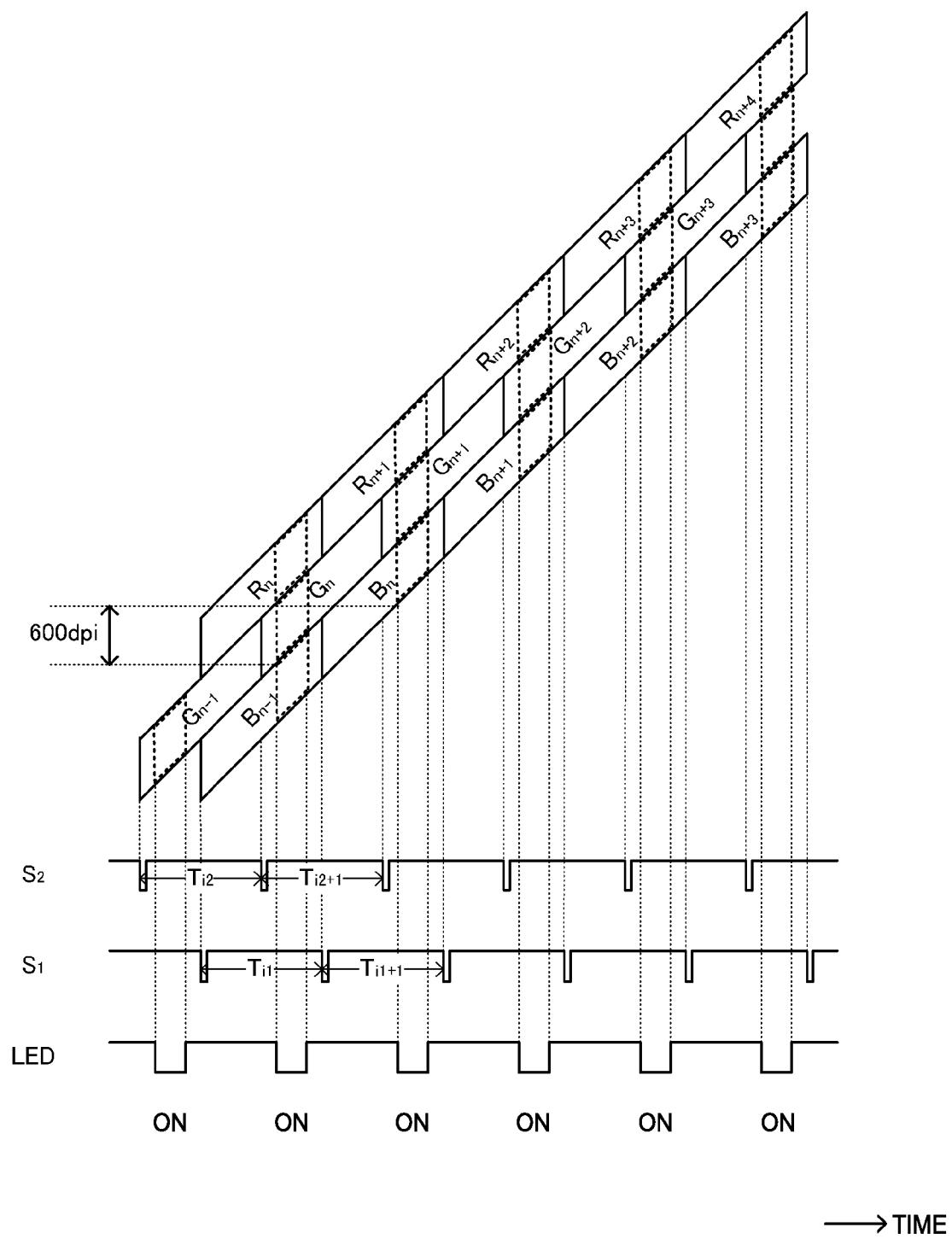
FIG. 5 is a timing chart of a comparison example.

To turn the LEDs 9 on during only one drive period, as shown in FIG. 5, for example, the LEDs 9 turn on in the second half of the R and B drive period, and the LEDs 9 turn on in the first half of the G drive period. As a result, the exposure conditions (the on timing; the time from the start of the drive period until the LEDs 9 emit and stop emitting) of the RGB sensors when accumulating a charge for the same range in the sub-scanning direction of the document are not the same. The scanning range of G in the sub-scanning direction of the document when the LEDs 9 are on is therefore offset 600 dpi from R and B.

As shown in FIG. 4, the LEDs 9 are therefore controlled in this embodiment of the invention to emit twice in one drive period (On period A, On period B), and the timing of the next On period A based on the first drive signal S1, and the timing of the next On period B based on the second drive signal S2, are the same. The length of the On period A and On period B are also controlled to be the same. As a result, the exposure conditions of the RGB sensor arrays are the same when scanning the same range in the sub-scanning direction of the document.

The pixel values (scanning results) output from the RGB sensors are A/D converted by the sampling unit 11, rearranged by the sorting unit 12 to express the pixel values scanned in the same range (same line) in the sub-scanning direction, and then image processed by the image processor 14 as described above. A scanned image of the document is produced through these processes. This embodiment of the invention can improve the image quality of the scanned image of the document compared with a configuration in which the exposure conditions of the sensor arrays are not the same. Using the image production method according to this embodiment of the invention thus enables producing scanned images with higher image quality than when the exposure conditions of the sensor arrays are not the same.

1-4: Interrupting and Resuming Scanning

The pixel values output from the sensors of the sensor 10 are stored sequentially as scanned image data in DRAM 15 through the sampling unit 11, sorting unit 12, and image processor 14. Scanned image data that has been sent from DRAM 15 to the personal computer 2 is deleted from DRAM 15, but if transferring the scanned image data to the personal computer 2 is delayed for some reason, the available capacity in DRAM 15 may drop because deleting scanned image data from DRAM 15 is slower than writing scanned image data the image processor 14 has already imaged processed to DRAM 15. When space available in DRAM 15 goes below a predetermined level, the image processor 14 outputs to the timing controller 17 a control signal to interrupt scanning. When the space available in DRAM 15 then goes above a predetermined level as a result the delay in transferring scanned image data to the personal computer 2 being resolved, the image processor 14 then outputs to the timing controller 17 a control signal to resume scanning.

Figure 6:
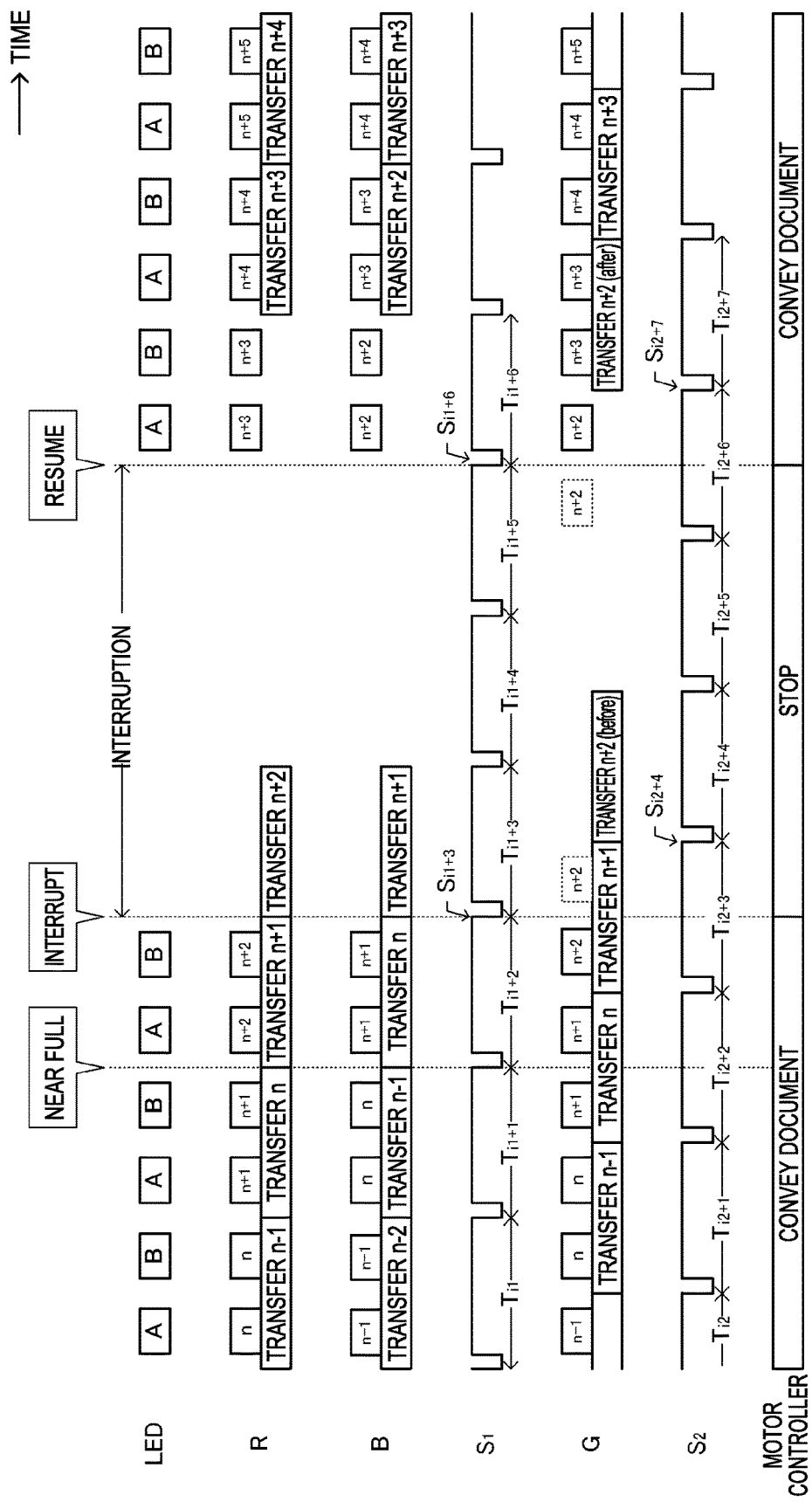
FIG. 6 is a timing chart of operation before and after scanning is interrupted.
Figure 7:
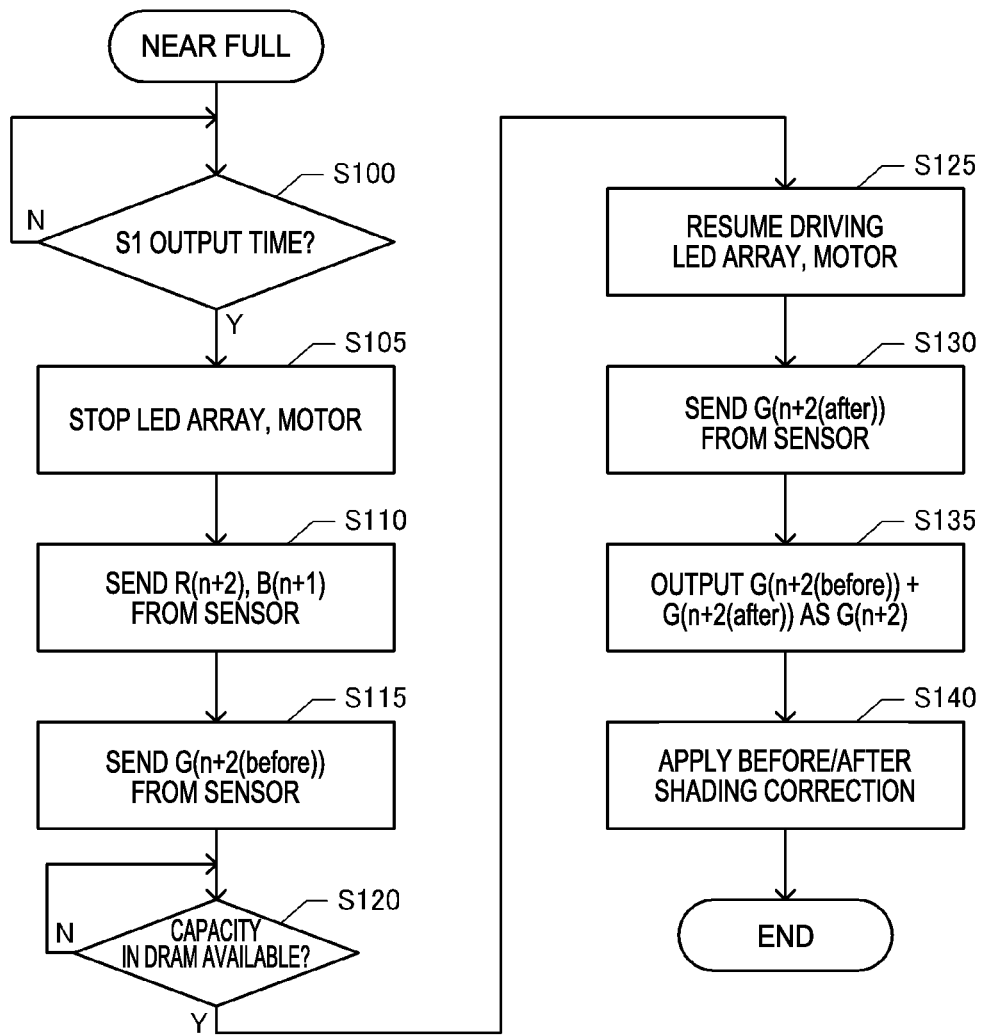
FIG. 7 is a flow chart of processing before and after scanning is interrupted.

FIG. 6 is a timing chart of the operation of the sensors in the RGB sensor arrays, the LEDs 9, and the motor controller 18 before and after interrupting scanning, and FIG. 7 is a flow chart of the operation of these parts before and after interrupting scanning.

As shown in FIG. 6, before interrupting (pausing) scanning (during the normal scanning operation), the R sensor array 101 and B sensor array 103 are charged synchronized to the first drive signal S1. During one drive period of the R sensor array 101 and B sensor array 103, the LEDs 9 emit twice, in period A and period B. In the next drive period after charge accumulation for line n, the pixel values of line n are sent from the sensor 10 through the sampling unit 11 and sorting unit 12 to SRAM 13, and image processed by the image processor 14. R sensor array 101 and B sensor array 103 operate in the same way after scanning resumes.

The G sensor array 102 is charged synchronized to the second drive signal S2 before (during the normal scanning operation) drive period Ti2+3 in which scanning is paused. During one drive period of G sensor array 102, the LEDs 9 emit twice, in period B and period A. In the next drive period after charge accumulation for line n, the pixel values of line n from G sensor array 102 are also sent from the sensor 10 through the sampling unit 11 and sorting unit 12 to SRAM 13, and image processed by the image processor 14.

When the image processor 14 determines the available capacity in the DRAM 15 has gone below a predetermined level (is nearly full), the scanner 1 executes the interruption process shown in FIG. 7.

FIG. 6 and FIG. 7 describe an example in which the R sensor array 101 stores charges for line n+2, and DRAM 15 becomes nearly full in drive period Ti1+2 while transferring pixel values for line n+1.

First, when a control signal instructing interrupting the scanning operation is acquired from the image processor 14, the timing controller 17 waits until the next output timing of the first drive signal S1 (in this example, until first drive signal Si1+3 indicating the start of drive period Ti1+3) (step S100). When this time arrives, the timing controller 17 turns the LEDs 9 off until period A after scanning resumes, and outputs a control signal to the motor controller 18 to stop conveyance, and stops the motor that conveys the document (step S105). Synchronized to first drive signal Si1+3 indicating the start of drive period Ti1+3, the pixel values (R (n+2)) from the R sensors for line n+2, and the pixel values (B(n+1)) from the B sensors for line n+1, are output through the sampling unit 11 and sorting unit 12 to SRAM 13 (step S110). Next, synchronized to second drive signal Si2+4 indicating the start of drive period Ti2+4, the pixel values (G(n+2) (before)) from the G sensors for line n+2 are output through the sampling unit 11 and sorting unit 12 to SRAM 13 (step S115).

Because first drive signal Si1+3 stops cyclical On control of the LEDs 9, the LEDs 9 are off in G sensor array 102 drive period Ti2+3 when, if scanning was not interrupted, the LEDs 9 should be on. Therefore, the G sensor array 102 charges in drive period Ti2+3 with the LEDs 9 on only during On period B in the first half and off during the second half of drive period Ti2+3. G(n+2 (before)) represents the pixel values of the G sensors for line n+2 when the LEDs 9 on only during On period B in the first half of drive period Ti2+3.

The image processor 14 then waits until the capacity of DRAM 15 rises above a predetermined level (step S120). When the capacity of DRAM 15 rises above the predetermined level, the image processor 14 outputs to the timing controller 17 a control signal instructing resuming scanning. Based on this control signal, the timing controller 17 resumes driving the LEDs 9 synchronized to the first drive signal Si1+6, and controls the motor controller 18 to resume document conveyance (step S125).

Synchronized to first drive signal Si1+6, the R sensor array 101 charges for line n+3. Synchronized to first drive signal Si1+6, the B sensor array 103 charges for line n+2. Because cyclical On control of the LEDs 9 and document conveyance resume from the second half of drive period Ti2+6, the G sensor array 102 charges in drive period Ti2+6 with the LEDs 9 not on in the first half and on only in the On period A in the second half of drive period Ti2+6. The pixel values G (n+2 (after)) from the G sensor array 102 for line n+2 are transferred synchronized to the first second drive signal Si2+7 after scanning resumes (step S130). Note that G (n+2 (after)) represents the pixel values of the G sensors for line n+2 only in On period A when the LEDs 9 are on in the second half of drive period Ti2+6.

The sorting unit 12 then outputs the combined values (G (n+2 (before))+G (n+2 (after))) of the pixel values from the G sensor before and after interruption to the image processor 14 as the pixel values G (n+2) from the G sensors for line n+2 (step S135). The sorting unit 12 then instructs the image processor 14 to apply a special before and after interruption shading correction process to the pixel values G (n+2) of the G sensors for line n+2 (step S140). In the shading correction process applied to the pixel values G (n+2) of the G sensors for line n+2 in response to this instruction, the image processor 14 subtracts the shading correction value (2BK) for two drive periods where a shading correction value (BK) for one drive period would be subtracted during normal scanning. More specifically, the pixel values for the G sensors for line n+2 after shading correction are (G(n+2 (before))+G(n+2 (after))−2BK. Note that the shading correction value is the value previously set before scanning started.

The pixel values G (n+2) from the G sensor before and after pausing are the sums of the pixel values from two drive periods, the noise component will also be from two drive periods. As a result, by subtracting the shading correction value for two drive periods from G(n+2), the pixel values of the G sensor before and after pausing can be accurately calculated. Note that the sorting unit 12 and image processor 14 embody a calculator that calculates the pixel values of the G sensor before and after pausing.

When the scanning interruption process shown in FIG. 7 ends, the G sensor array 102 also resumes normal operation. As a result, the scanner 1 according to this embodiment can also produce scanned images at 300 dpi using the sensor 10.

2. Other Embodiments

The invention is not limited to embodiment described above, and can be modified and adapted in many ways without departing from the scope of the claims.

The light source of the scanner according to the invention is off except when on during the period between the first drive signal and the second drive signal output next after the first drive signal, and the period between the second drive signal and the first drive signal output next after the second drive signal.

The LEDs 9 may also have one or more On periods between the first drive signal S1 and the next second drive signal S2, and between the second drive signal S2 and the next first drive signal S1. For example, the LEDs 9 may have two on periods, such as off-on-off-on-off, in each period. There may likewise be three or more on periods. In this case, the On timing in each period is preferably the same. Note that the On timing being the same is not limited to emitting at precisely the same time after the start of each period, and stopping emitting at precisely the same time after the start of each period. For example, when scanning with 256 gradations, even if there is an offset of $1/256$ of the emitting time, the captured gradation will be offset less than 1. A time deviation that does not affect image quality is thus allowed.

The foregoing embodiment describes scanning at 300 dpi using sensor arrays disposed a distance equal to 600 dpi apart in the sub-scanning direction, but the invention is not so limited. For example, the method of the invention can also be used when scanning at 600 dpi using sensor arrays disposed a distance equal to 1200 dpi apart in the sub-scanning direction. Furthermore, scanning at 200 dpi using sensor arrays disposed a distance equal to 600 dpi apart in the sub-scanning direction is possible by using three drive signals S1, S2, S3 to offset the drive timing of the RGB sensors so that the LEDs 9 emit once each in the intervals between the drive signals. The intervals between the drive signals in this case are the interval between S1 and S2, which is the drive signal output next after S1; the interval between S2 and S3, which is the drive signal output next after S2; and the interval between S3 and S1, which is the drive signal output next after S3.

In a scanner according to the invention, there must simply be relative movement between the document and sensor array. Configurations that move the document relative to a stationary sensor array, and configurations that move the sensor array relative to a stationary document, are both conceivable.

When scanning is interrupted and resumed by the scanner of the invention synchronized to the first drive signal, the light source may not turn on during the interruption. Furthermore, the scanner may further comprise a calculator that, when scanning is paused and resumed synchronized to the first drive signal, computes the pixel values of pixels corresponding to before and after the interruption, based on the pixel values of the second sensors of a second sensor array before and after an interruption shorter than the On period in normal operation. Note that the normal operation in this configuration means the normal scanning operation outside of when scanning is paused and before and after pausing. The scanning interruption (pause) means the time from when scanning is interrupted to when scanning resumes.

Scanning is interrupted (paused) when, for some reason, the buffer memory for temporarily storing data resulting from the scanning operation is full or nearly full. Scanning resumes when space is again available in the buffer memory. In a configuration that pauses scanning synchronized to the first drive signal, that is, stops On control of the light source and relative movement of the document synchronized to the first drive signal, scanning is interrupted timed to the first sensor array having store the charge for one drive period, but On control of the light source and relative movement of the document stop in the middle of a second sensor array drive period. Furthermore, in a configuration that resumes scanning synchronized to the first drive signal, that is, resumes On control of the light source and relative movement of the document synchronized to the first drive signal, charging the first sensor array can resume from the start of one drive period, but On control of the light source and relative movement of the document are stopped for the second sensor array in the middle of one drive period.

By comprising a calculator as described above, this configuration can save instead of deleting the pixel values of the second sensors immediately before scanning pauses, and can use the saved pixel values with the pixel values of the second sensors immediately after the interruption to calculate the values of the second sensors corresponding to pixels before and after the interruption. Loss of pixel values from the second sensors can therefore be prevented even if scanning is interrupted.

Note that in a configuration that pauses and resumes scanning synchronized to the second drive signal, the calculator calculates the pixel values of the first sensors corresponding to the pixels before and after the pause based on the pixel values from the first sensors before and after the pause.

In the scanner described above, when pausing and resuming scanning synchronized to the first drive signal, the calculator may calculate the pixel values of the second sensors corresponding to the pixels before and after the interruption by subtracting, from the sum of the pixel values of the second sensors in the second sensor array before and after an interruption that is shorter than the On time during normal operation, a shading correction value of one drive period more than during normal operation.

During normal operation the shading correction value of one drive period is subtracted, but in this configuration that subtracts the pixel values from pixels before and after pausing from the sum of the pixel values for two drive periods, the shading correction value for two drive periods must be subtracted. By subtracting the shading correction value for two drive periods, the accuracy of the pixel values from the second sensors before and after the interruption can be improved.

Note that the calculator subtracting, from the sum of the pixel values of the second sensors in the second sensor array before and after an interruption that is shorter than the On time during normal operation, a shading correction value of one period more than during normal operation, may be restated as the calculator subtracting, from the sum of the pixel values of the second sensors in the second sensor array before and after an interruption that is shorter than the On time during normal operation, a shading correction value of two drive periods.

In the embodiment described above the three sensor arrays, for red, green, and blue, are arranged in the order R, G, B, but the order of the sensor arrays is not limited to R, G, B. The second of the three sensor arrays may be R or B. The sensors are also not limited to being primary color (RGB) sensors as in the embodiment described above, and configurations using complementary color sensors are also conceivable.

The functions of parts described in the following claims may be embodied by hardware resources whereby the configuration itself determines the function, by hardware resources of which the function is determined by a program, or by combinations of these. The functions of specific parts are also not limited to embodiments of physically discrete, independent hardware resources. At least some functions may also be embodied by multiple hardware resources that are physically discrete.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A scanner comprising:
a first sensor array including multiple first sensors arrayed in a main scanning direction;
a second sensor array, including multiple second sensors arrayed in the main scanning direction, disposed offset in a sub-scanning direction from the first sensor array, the second sensor array being disposed between, in the sub-scanning direction, two sensor arrays associated with the first sensor array;
a timing controller configured to cyclically output, at different times, to the first sensor array and second sensor array, a first drive signal that drives the multiple first sensors of the first sensor array, and a second drive signal that drives the multiple second sensors of the second sensor array;
a light source configured to emit and illuminate a document during periods between the first drive signal and the second drive signal output next after the first drive signal, and periods between the second drive signal and the first drive signal output next after the second drive signal; and
a calculator comprising an image processor, the calculator being configured to interrupt processing of output values from the second sensors when an available memory capacity falls below a threshold level.

2. The scanner described in claim 1, wherein:
when interrupting and resuming scanning synchronized to the first drive signal, the light source does not emit while scanning is interrupted;
the scanner further includes the calculator configured to calculate, based on converted pixel values generated by a sampling unit converting output values from the second sensors of the second sensor array before and after an interruption shorter than an On time in normal operation, valves of the converted pixel values corresponding to the pixels before and after the interruption.

3. The scanner described in claim 2, wherein:
when interrupting and resuming scanning synchronized to the first drive signal,
the calculator calculates the converted pixel values of the second sensors corresponding to the pixels before and after the interruption by subtracting, from the sum of the converted pixel values of the second sensors of the second sensor array before and after an interruption that is shorter than the On time during normal operation, a shading correction value of one drive period more than during normal operation.

4. The scanner described in claim 1, wherein:
when scanning resumes immediately after pausing, the light source does not emit while scanning is paused;
the scanner further including the calculator configured to calculate the converted pixel values of the second sensors corresponding to the pixels before and after the interruption, based on the converted pixel values generated by a sampling unit converting output values from the second sensors during the period of the second drive signal when the light source emitted immediately before the interruption, and the converted pixel values generated by the sampling unit converting output values from the second sensors during the period of the second drive signal when the light source emitted immediately after the interruption.

5. The scanner described in claim 1, wherein:
the light source emits for the same time between the first drive signal and the second drive signal output next after the first drive signal, and between the second drive signal and the first drive signal output next after the second drive signal.

6. The scanner described in claim 1, wherein:
the on timing of the light source is the same in the periods between the first drive signal and the second drive signal output next after the first drive signal, and the periods between the second drive signal and the first drive signal output next after the second drive signal.

7. A method of producing a scanned image using a scanner having a first sensor array including:
multiple first sensors arrayed in a main scanning direction,
a second sensor array, including multiple second sensors arrayed in the main scanning direction, disposed offset in a sub-scanning direction from the first sensor array, the second sensor array being disposed between, in the sub-scanning direction, two sensor arrays associated with the first sensor array,
a timing controller,
a light source, and
a calculator comprising an image processor,
the scanned image production method comprising:
multiple first sensors reading a document according to a first drive signal applied cyclically by the timing controller;
multiple second sensors reading a document according to a second drive signal applied cyclically by the timing controller;
emitting and illuminating the document during periods between the first drive signal and the second drive signal output next after the first drive signal, and periods between the second drive signal and the first drive signal output next after the second drive signal;
interrupting processing of read results of the multiple second sensors if an available memory capacity falls below a threshold level, and
generating a scanned image based on the read result of the multiple first sensors and the read result of the multiple second sensors.

8. A scanner comprising:
a first sensor array, including multiple first sensors arrayed in a main scanning direction;
a second sensor array, including multiple second sensors arrayed in the main scanning direction, disposed offset in a sub-scanning direction from the first sensor array;
a third sensor array, including multiple third sensors arrayed in the main scanning direction, disposed offset in the sub-scanning direction from the first sensor array and the second sensor array;
a timing controller configured to output a first drive signal to the first sensor array and the third sensor array in a first cycle and configured to output a second drive signal to the second sensor array in a second cycle at a timing different from the first cycle, the first drive signal drives the multiple first sensors of the first sensor array and the multiple third sensors of the third sensor array, and the second drive signal drives the multiple second sensors of the second sensor array; and
a light source configured to emit and illuminate a document during periods between the first drive signal and the second drive signal output after the first drive signal, and periods between the second drive signal and the first drive signal output after the second drive signal.

9. The scanner described in claim 8 wherein:
the first sensor array comprises a red sensor array, the second sensor array comprises a blue sensor array and the third sensor array comprises a green array.

* * * * *